United States Patent
Zhang et al.

(10) Patent No.: US 12,013,224 B2
(45) Date of Patent: Jun. 18, 2024

(54) CONTACTLESS DISPLACEMENT SENSOR EMPLOYING FLEXIBLE PHOTOELECTRIC NANOFILM

(71) Applicant: ZHEJIANG UNIVERSITY, Zhejiang (CN)

(72) Inventors: He Zhang, Hangzhou (CN); Li Wang, Hangzhou (CN); Yuhui Zhou, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 279 days.

(21) Appl. No.: 17/553,728

(22) Filed: Dec. 16, 2021

(65) Prior Publication Data
US 2022/0107172 A1    Apr. 7, 2022

Related U.S. Application Data

(63) Continuation of application No. PCT/CN2020/134371, filed on Dec. 8, 2020.

(30) Foreign Application Priority Data

Dec. 28, 2019    (CN) .......................... 201911384616.2

(51) Int. Cl.
G01B 11/16    (2006.01)
G01B 11/02    (2006.01)
B82Y 15/00    (2011.01)

(52) U.S. Cl.
CPC .............. *G01B 11/16* (2013.01); *G01B 11/02* (2013.01); *B82Y 15/00* (2013.01)

(58) Field of Classification Search
CPC ......... G01B 11/16; G01B 11/02; G01B 11/61; G01B 11/165; G01B 11/18; G01B 11/026;
(Continued)

(56) References Cited

U.S. PATENT DOCUMENTS 5,684,298 A * 11/1997 O'Connor ................ G01D 5/26
250/227.21
2018/0164093 A1    6/2018 Westcott

FOREIGN PATENT DOCUMENTS

CN           1086927 A       5/1994
CN         201438141 U       4/2010
(Continued)

OTHER PUBLICATIONS

English translation of CN-111156903-A, published on May 15, 2020. (Year: 2020).*
(Continued)

*Primary Examiner* — Christina A Riddle
(74) *Attorney, Agent, or Firm* — W&G Law Group

(57) ABSTRACT

Provided is a contactless displacement sensor based on a flexible photoelectric nanofilm. The displacement sensor is fixed on a mid-span surface of a bridge; a laser light source is arranged under the displacement sensor, and after the has a deflection, the displacement sensor is displaced along with the bridge, resulting in a corresponding change in an output current; the change of a laser transmission distance, namely the deflection of the bridge, can be obtained through back calculation according to an output current signal. Compared with other traditional deflection measuring devices, the contactless displacement sensor based on a flexible photoelectric nanofilm has the advantages of a simple structure, a high measuring precision, a high response speed, a wide in application range, being capable of achieving real-time automatic measurement and the like.

2 Claims, 1 Drawing Sheet

(58) Field of Classification Search
CPC ..... G01B 11/24; G01B 11/303; G01B 11/272; G01B 21/32; G01B 11/28–306; B82Y 15/00; B82Y 40/00; G01M 5/0008; G01M 5/0041; G01M 5/0091; G01M 11/081; G01M 5/0058; G01M 5/0066; G01L 9/0076; G01L 9/0077; G01L 5/0047; G01S 17/02; G01S 17/06; G01S 17/42; G01S 17/10
USPC .......................... 356/614–640; 73/773, 760
See application file for complete search history.

(56) References Cited

FOREIGN PATENT DOCUMENTS

| | | | | |
|---|---|---|---|---|
| CN | 103278300 | A | | 9/2013 |
| CN | 103940561 | A | | 7/2014 |
| CN | 104993056 | A | * | 10/2015 |
| CN | 105355700 | A | | 2/2016 |
| CN | 106404321 | A | | 2/2017 |
| CN | 106449669 | A | | 2/2017 |
| CN | 106610272 | A | | 5/2017 |
| CN | 109916582 | A | | 6/2019 |
| CN | 110487197 | A | | 11/2019 |
| CN | 111156903 | A | * | 5/2020 ............. B82Y 15/00 |
| CN | 111156903 | A | | 5/2020 |
| JP | 02187077 | A | | 7/1990 |
| JP | 07270120 | A | | 10/1995 |
| JP | 07270120 | A | * | 10/1995 |
| JP | 2014074685 | A | | 4/2014 |
| KR | 20170136130 | A | | 12/2017 |
| WO | 2011006523 | A1 | | 1/2011 |
| WO | WO-2021129370 | A1 | * | 7/2021 ............. B82Y 15/00 |

OTHER PUBLICATIONS

English translation of CN-104993056-A, published on Oct. 21, 2015. (Year: 2015).*
English translation of JP-07270120-A, published Oct. 20, 1995. (Year: 1995).*
English translation of WO2021/129370 (Year: 2021).*
JP First Office Action(JP2021-572110); Date of Mailing: Nov. 25, 2022.
International Search Report (PCT/CN2020/134371); Date of Mailing: Feb. 26, 2021.
First Office Action(201911384616.2); Date of Mailing: Jul. 3, 2020.
Notice Of Allowance(201911384616.2); Date of Mailing: Jul. 31, 2020.
Review-on-Deflection-Monitoring-Methods-of-Long-span-Bridges(machine translation); Date of Mailing: Dec. 31, 2015.

* cited by examiner

CONTACTLESS DISPLACEMENT SENSOR EMPLOYING FLEXIBLE PHOTOELECTRIC NANOFILM

CROSS-REFERENCE TO RELATED APPLICATIONS

The present application is a continuation of International Application No. PCT/CN2020/134371, filed on Dec. 8, 2020, which claims priority to Chinese Application No. 201911384616.2, filed on Dec. 28, 2019, the contents of both of which are incorporated herein by reference in their entireties.

TECHNICAL FIELD

The present application relates to a contactless displacement sensor based on a flexible photoelectric nanofilm.

BACKGROUND

Beams are important load-bearing components of a bridge structure, and the deflection of the beam is an important parameter to evaluate the dynamic state, measure the fatigue damage and ensure the structural safety of the bridge. In the current traffic engineering, the commonly used beam deflection measurement methods mainly include dial indicator measurement, precision level measurement, total station measurement, communicating pipe measurement, differential GPS observation and the like. The dial indicator measurement method is to amplify the displacement value of the position detected by the gear rotating mechanism, and convert the detected linear reciprocating motion into the rotary rotation of a pointer to indicate the displacement value of the position. This method is simple in equipment and can be used for multi-point measurement. The string wire dial indicator measurement method can only be used to measure the bridge deflection on the land or a frozen water surface in the north, and it cannot be used for a high bridge or when there is water, or a high platform has to be built. The precision level measurement is a method of measuring a height difference between two points by using a level and a leveling ruler. Starting from the leveling origin or any known elevation point, the elevation of each point is measured station by station along a selected leveling route, and the relative deflection is obtained from the difference of the reading of the leveling ruler. However, this method can only be used to measure a relative value, not an absolute value. The total station measurement method is a trigonometric leveling method, which calculates a height difference between two points by measuring the horizontal distance between the two points and a vertical angle. This measuring method is simple and not limited by terrain conditions, but there will be observation errors caused by different observation methods and experiences of observers. Even if a static measurement is carried out, the data is often scattered, and real-time and automatic measurement cannot be achieved. The communicating pipe measurement method is based on the principle of "the pressure of the static liquid in the same horizontal plane in the communicating device is the same" in physics. A communicating pipe is arranged at each measuring point, and water (or other colored liquid) is poured to the scale position; when there is a deflection in the bridge, the horizontal liquid level in the water pipe is still flat, but the relative water level of each measuring point will change. The deflection of the bridge can be obtained by reading the changed value. The calculation is simple, and due to the totally enclosed structure, it is not affected by environmental conditions such as high dust and high humidity on the bridge site, but the accuracy of this method is low, and thus can only be used for static deflection detection of low frequency or ultra-low frequency bridges, and is not suitable for bridges with a long span and a large longitudinal slope. In the differential GPS observation method, GPS mobile stations are placed at the desired measuring points, and the position of a deformation point relative to a reference point is obtained in real time through GPS observation, the change of the spatial position of the measuring point can be directly reflected, thereby obtaining the deflection value of bridge structure. However, its measurement accuracy is low, generally only reaching a centimeter level, and it is not suitable for high-precision deflection detection of small and medium-sized bridges.

SUMMARY

In view of the shortcomings of the prior art, the present application provides a contactless displacement sensor based on a flexible photoelectric nanofilm, which can convert the bridge deflection into the electric energy of the displacement sensor and output it in the form of electric signals. The present application has the characteristics of a high precision, a wide application range, a fast response speed and real-time intelligent perception.

A contactless displacement sensor based on a flexible photoelectric nanofilm, wherein the displacement sensor is fixed on a mid-span surface of a bridge, a laser light source is arranged directly under the displacement sensor, and when there is a deflection in the bridge, the displacement sensor is displaced along with the bridge, resulting in a corresponding change in output current; it is assumed that before the bridge is deformed, a distance between the laser light source and the displacement sensor is L1, the output current is $I_1$, and after the bridge is deformed, the distance between the laser light source and the displacement sensor is L2, and the output current is $I_2$, then the corresponding relationship between the output current of the displacement sensor and the deflection of the bridge is as follows:

$$\Delta L(t) = L(t_1) - L(t_2) = \chi_1\left(\frac{\varepsilon I(t_1)}{e}, \Delta I_1 \alpha \beta e^{-k}, \frac{-n_i}{\tau_{n0} + \tau_{p0}}\right) - \chi_2\left(\frac{\varepsilon I(t_2)}{e}, \Delta I_2 \alpha \beta e^{-k}, \frac{-n_i}{\tau_{n0} + \tau_{p0}}\right)$$

where $\Delta L(t)$ is the deflection, $L(t)$ is a laser transmission distance, e is a single electron charge, $\varepsilon$ is a dielectric constant of a material, $I(t)$ is the output current, $\Delta I$ is a difference between an emergent light intensity and a background light intensity, $\alpha$ and $\beta$ are respectively a light absorption coefficient and a quantum efficiency of the material, k is an attenuation coefficient in air, $n_i$ is an intrinsic carrier concentration, and $\tau_{n0}$ and $\tau_{p0}$ are the lifetimes of electrons and holes respectively.

Furthermore, according to the contactless displacement sensor based on a flexible photoelectric nanofilm, wherein the wavelength of the laser light source is 680 nm.

Further, according to the contactless displacement sensor based on a flexible photoelectric nanofilm, wherein the laser light is vertically irradiated on the displacement sensor.

The present application has the following beneficial effects:

Based on the displacement sensor, the present application converts the distance information when there is a deflection in the bridge into an electric signal, and the deflection can be expressed and output by the electric signal through an integrated output device. At the same time, due to the flexibility of the sensor itself, it has good ductility and denaturation ability, and can be displaced along with the deflection of the bridge. Compared with other traditional deflection measuring devices, the contactless displacement sensor based on a flexible photoelectric nanofilm has the advantages of a simple structure, a high measurement accuracy, a fast response speed, a wide application range, real-time automatic measurement and the like.

Reference signs: 1 sensor position before deflection; a sensor position after deflection; 3 laser light source; $L_1$ initial distance between the sensor and the light source; $L_2$ distance between the sensor and the light source after deflection.

DESCRIPTION OF EMBODIMENTS

The purpose and effect of the present application will become clearer from the following detailed description of the present application according to the drawings and preferred embodiments. It shall be understood that the specific embodiments described here are only used to explain, not to limit, the present application.

Figure 1:
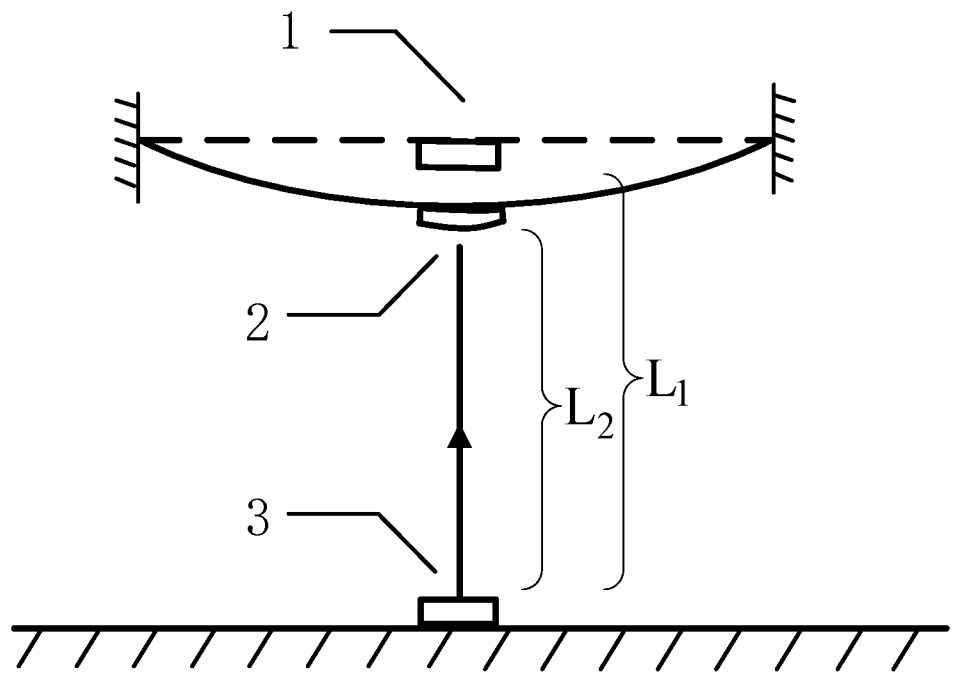
FIG. 1 is a schematic diagram of measurements before and after deflection of a bridge.

As shown in FIG. 1, the contactless displacement sensor based on a flexible photoelectric nanofilm provided by the present application is fixed on the surface of a middle span of a bridge (position 1), and a laser light source 3 is arranged directly under the displacement sensor. When there is a deflection in the bridge, the displacement sensor will be displaced along with the bridge (position 2), resulting in a corresponding change in an output current. Before the bridge is deformed, the distance between the laser light source and the displacement sensor is $L_1$ and the output current is $I_1$, while after the bridge is deformed, the distance between the laser light source and the displacement sensor is $L_2$ and the output current is $I_2$.

The principle of deflection measurement by the displacement sensor of the present application is as follows:

A photoelectric sensor is based on a PN junction and satisfies a Poisson equation:

$$\frac{\partial^2 \phi(x,t)}{\partial x^2} = -\frac{e}{\varepsilon}[p(x,t) - n(x,t) + N] \quad (1)$$

where $\phi(x, t)$ represents the potential distribution in a material, and x and t are the position coordinate and time coordinate, respectively; e represents a single electron charge, and p(x, t) and n(x, t) represents the concentration distribution of holes and free electrons in the material respectively; $\varepsilon$ is a dielectric constant of the material, and N is a net doping concentration.

The output current at time t satisfies:

$$I(t) = \frac{\phi(d,t)}{d} = \int_0^d dx \int_0^d -\frac{e}{\varepsilon}[p(x,t) - n(x,t) + N]dx \quad (2)$$

where $\phi(d, t)$ is the potential of a P region and d is the thickness of the PN junction.

Both the electron continuity equation (3) and the hole continuity equation (4) are satisfied:

$$\frac{\partial n(x,t)}{\partial t} = \frac{\partial J_n(x,t)}{\partial x} + G(x,t) - R(x,t) \quad (3)$$

$$\frac{\partial p(x,t)}{\partial t} = -\frac{\partial J_p(x,t)}{\partial x} + G(x,t) - R(x,t) \quad (4)$$

where $J_n$ and $J_p$ are the current densities of electrons and holes respectively, G(x, t) represents a generation rate of electron-hole pairs excited by the light field, and correspondingly R(x, t) is the recombination rate of nonequilibrium electron holes, wherein $J_n$ and $J_p$ satisfy:

$$J_n(x,t) = -e\mu_n n(x,t)\frac{\partial \phi(x,t)}{\partial x} + e\frac{k_B T}{e}\mu_n \frac{\partial n(x,t)}{\partial x} \quad (5)$$

$$J_p(x,t) = -e\mu_n p(x,t)\frac{\partial \phi(x,t)}{\partial x} + e\frac{k_B T}{e}\mu_p \frac{\partial n(x,t)}{\partial x} \quad (6)$$

where $\mu_n$ and $\mu_p$, are the mobilities of electrons and holes respectively, $k_B$ is a Boltzmann constant, and T is a temperature.

R(x, t) satisfies the equation:

$$R(x,t) = \frac{p(x,t)n(x,t) - n_i^2}{\tau_{n0}(n(x,t) + n_i) + \tau_{p0}(p(x,t) + n_i)} \quad (7)$$

where $n_i$ is an intrinsic carrier concentration, and $\tau_{n0}$ and $\tau_{p0}$ are the lifetimes of electrons and holes respectively.

G (x, t) satisfies the equation:

$$G(x,t) = (I_0 - I_b)\alpha\beta e^{-\alpha x}$$

where $\alpha$ and $\beta$ respectively represent a light absorption coefficient and a quantum efficiency of the material, $I_0$ is an emergent light intensity of the light source and $I_b$ is a background light intensity.

Particularly, unlike the application of a traditional photoelectric sensor, in the engineering case described in the present application, due to the deflection, it is necessary to consider that the illumination intensity of the laser will be attenuated in the air with the change of the laser transmission distance, therefore it is necessary to introduce an attenuation term, and modify equation (8) as follows:

$$G(x,t) = (I_0 - I_b)\alpha\beta e^{-(kL + \alpha x)} \quad (9)$$

where k is an attenuation coefficient in air and L is a laser transmission distance.

Substituting equations (3)-(9) into equation (2) to obtain:

-continued $$I(t) = \frac{\phi(d, t)}{d} = \int_0^d dx \int_0^d -\frac{e}{\varepsilon}[p(x, t) - n(x, t) + N]dx$$

$$= \int_0^d dx \int_0^d -\frac{e}{\varepsilon} \left[ \begin{array}{c} \int_0^d \left( -\frac{\partial J_p(x, t)}{\partial x} + (I_0 - I_b)\alpha\beta e^{-(kL+ax)} - \frac{p(x, t)n(x, t) - n_i^2}{\tau_{n0}(n(x, t) + n_i) + \tau_{p0}(p(x, t) + n_i)} \right)dx \\ -\int_0^d \left( \frac{\partial J_n(x, t)}{\partial x} + (I_0 - I_b)\alpha\beta e^{-(kL+ax)} - \frac{p(x, t)n(x, t) - n_i^2}{\tau_{n0}(n(x, t) + n_i) + \tau_{p0}(p(x, t) + n_i)} \right)dx + N \end{array} \right] a$$

thereby a mapping relationship between the laser transmission distance and the output current can be established: I(t)→L(t):

$$L(t) = \chi\left(\frac{\varepsilon I(t)}{e}, \Delta I\alpha\beta e^{-k}, \frac{-n_i}{\tau_{n0} + \tau_{p0}}\right) \quad (11)$$

L(t) represents a laser transmission distance, and γ is an implicit equation of L(t).

and the deflection ΔL(t) is the difference between the two transmission distances, namely:

$$\Delta L(t) = L(t_1) - L(t_2) = \quad (12)$$
$$\chi_1\left(\frac{\varepsilon I(t_1)}{e}, \Delta I_1\alpha\beta e^{-k}, \frac{-n_i}{\tau_{n0} + \tau_{p0}}\right) - \chi_2\left(\frac{\varepsilon I(t_2)}{e}, \Delta I_2\alpha\beta e^{-k}, \frac{-n_i}{\tau_{n0} + \tau}\right)$$

$L(t_1)$ and $L(t_2)$ represent laser transmission distances corresponding to different times, $\gamma_1$ is an implicit equation of $L(t_1)$, and $\gamma_2$ is an implicit equation of $L(t_2)$.

Figure 2:
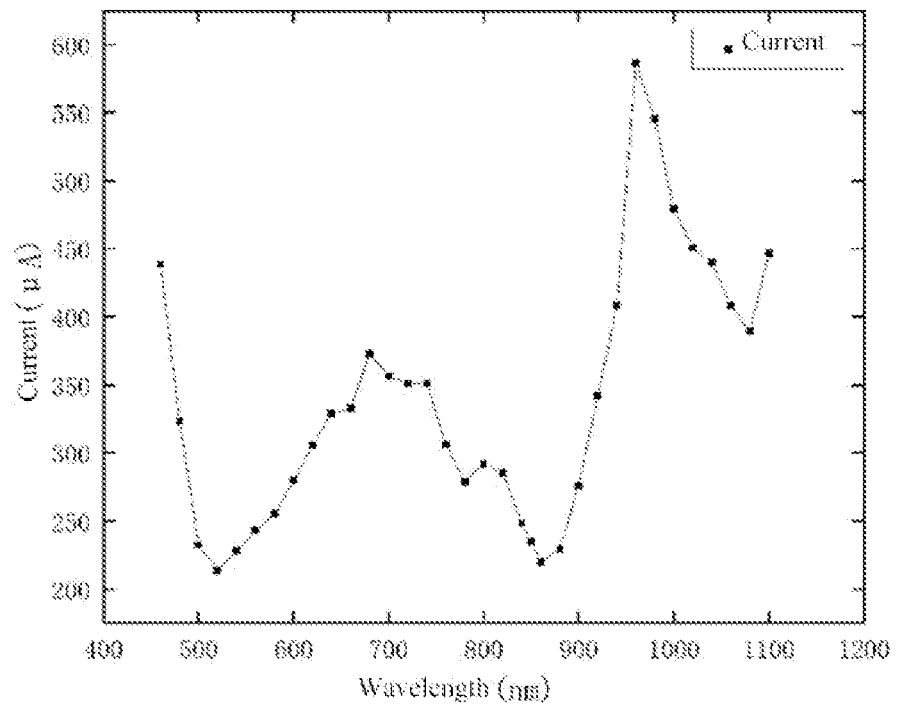
FIG. 2 is a spectrum response diagram of a displacement sensor.

In addition, as shown in FIG. 2, the displacement sensor of the present application obtains a peak value in the visible light range when the laser wavelength is 680 nm, which is beneficial to signal output and device layout, therefore the wavelength of the laser light source of the present application is selected as 680 nm.

It can be understood by those skilled in the art that the above description is only the preferred examples of the present application, and is not intended to limit the present application. Although the present application has been described in detail with reference to the foregoing examples, those skilled in the art can still modify the technical solutions described in the foregoing examples or replace some of their technical features equivalently. Within the spirit and principle of the present application, the modifications, equivalents replacements and so on shall be included within the scope of protection of the present application.

What is claimed is:

1. A contactless displacement sensor comprising a flexible photoelectric nanofilm,
wherein the flexible photoelectric nanofilm comprises a PN junction, the displacement sensor is fixed on a mid-span surface of a bridge, a laser light source is provided directly under the displacement sensor, a wavelength of the laser light source is 680 nm, and laser light is vertically irradiated on the displacement sensor,
wherein when there is a deformation in the bridge, the displacement sensor is displaced along with the bridge, resulting in a corresponding change in an output current of the PN junction,
wherein before the bridge is deformed, a distance between the laser light source and the displacement sensor is $L(t_1)$, the output current is $I(t_1)$, while after the bridge is deformed, the distance between the laser light source and the displacement sensor is $L(t_2)$, and the output current is $I(t_2)$, and the output currents of the displacement sensor and the deflection of the bridge satisfy:

$$\Delta L(t) = L(t_1) - L(t_2) =$$
$$\chi_1\left(\frac{\varepsilon I(t_1)}{e}, \Delta I_1\alpha\beta e^{-k}, \frac{-n_i}{\tau_{n0} + \tau_{p0}}\right) - \chi_2\left(\frac{\varepsilon I(t_2)}{e}, \Delta I_2\alpha\beta e^{-k}, \frac{-n_i}{\tau_{n0} + T_{p0}}\right),$$

where ΔL(t) is the deflection of the bridge, xi is an equation of $L(t_1)$, $\chi^2$ is an equation of $L(t_2)$, e is a single electron charge, ε is a dielectric constant of a material, ΔI is a difference between an emergent light intensity and a background light intensity, α and β are a light absorption coefficient and a quantum efficiency of the material, respectively, k is an attenuation coefficient in air, $n_i$ is an intrinsic carrier concentration, and $\tau_{n0}$ and $\tau_{p0}$ are the lifetimes of electrons and holes, respectively.

2. A method of measuring a deflection of a bridge by a contactless displacement sensor, wherein the contactless displacement sensor comprises a flexible photoelectric nanofilm including a PN junction, the displacement sensor is fixed on a mid-span surface of a bridge, a laser light source is provided directly under the displacement sensor, a wavelength of the laser light source is 680 nm, and laser light is vertically irradiated on the displacement sensor,
wherein when there is a deformation in the bridge, the displacement sensor is displaced along with the bridge, resulting in a corresponding change in an output current of the PN junction,
the method comprises:
measuring the output current $I(t_1)$ of the PN junction before the bridge is deformed, and calculating a distance $L(t_1)$ between the laser light source and the displacement sensor before the bridge is deformed;
measuring the output current $I(t_2)$ of the PN junction after the bridge is deformed, and calculating the distance $L(t_2)$ between the laser light source and the displacement sensor after the bridge is deformed; and
obtaining the deflection of the bridge according to the following equation:

$$\Delta L(t) = L(t_1) - L(t_2) =$$
$$\chi_1\left(\frac{\varepsilon I(t_1)}{e}, \Delta I_1\alpha\beta e^{-k}, \frac{-n_i}{\tau_{n0} + \tau_{p0}}\right) - \chi_2\left(\frac{\varepsilon I(t_2)}{e}, \Delta I_2\alpha\beta e^{-k}, \frac{-n_i}{\tau_{n0} + T_{p0}}\right),$$

wherein ΔL(t) is the deflection of the bridge, xi is an equation of $L(t_1)$, $\chi_2$ is an equation of $L(t_2)$, e is a single electron charge, ε is a dielectric constant of a material, ΔI is a difference between an emergent light intensity and a background light intensity, α and β are a light absorption coefficient and a quantum efficiency of the material, respectively, k is an attenuation coefficient in air, $n_i$ is an intrinsic carrier concentration, and $\tau_{n0}$ and $\tau_{p0}$ are the lifetimes of electrons and holes, respectively.

* * * * *